United States Patent

Takenaka et al.

[11] 4,337,288
[45] Jun. 29, 1982

[54] MAGNETIC RECORDING MEDIUM

[75] Inventors: Haruo Takenaka; Eiichi Tadokoro; Masaaki Fujiyama, all of Odawara, Japan

[73] Assignee: Fuji Photo Film Co., Ltd., Kanagawa, Japan

[21] Appl. No.: 207,546

[22] Filed: Nov. 17, 1980

[30] Foreign Application Priority Data

Nov. 28, 1979 [JP] Japan .............................. 54-154784

[51] Int. Cl.$^3$ .............................................. G11B 5/70
[52] U.S. Cl. ................................... 428/172; 360/134; 360/135; 360/136; 427/128; 427/130; 428/328; 428/329; 428/330; 428/409; 428/694; 428/900
[58] Field of Search ............... 428/409, 900, 694, 695, 428/141, 143, 149, 150, 172, 328, 329, 330; 427/128, 130; 360/134, 135, 136

[56] References Cited

U.S. PATENT DOCUMENTS

| | | | |
|---|---|---|---|
| 3,817,785 | 6/1974 | Abitoul | 427/130 |
| 4,015,042 | 3/1977 | Chassaigne | 428/900 |
| 4,071,654 | 1/1978 | Ogama et al. | 428/900 |
| 4,100,326 | 7/1978 | Somezawa et al. | 427/130 |
| 4,272,602 | 6/1981 | Stemme et al. | 427/128 |

Primary Examiner—Stanley S. Silverman
Attorney, Agent, or Firm—Sughrue, Mion, Zinn, Macpeak & Seas

[57] ABSTRACT

A magnetic recording medium comprising a coated magnetic recording layer having video and chroma S/N ratios appropriately balanced with tape transporting characteristics is attained by controlling the magnetic layer to have a surface roughness such that the maximum value of the arithmetical average roughness (Ra) is about 80 Å or greater in the surface roughness pitch region greater than about 300 μm while in the surface roughness pitch region of about 5 μm to about 100 μm the maximum value of the arithmetical average roughness (Ra) is about 40 Å or less.

5 Claims, 2 Drawing Figures $$Ra_L = \frac{1}{\ell_L} \int_0^{\ell_L} |f(x)| \, dx$$

$$Ra_S = \frac{1}{\ell_S} \int_0^{\ell_S} |f(x)| \, dx$$

MAGNETIC RECORDING MEDIUM

BACKGROUND OF THE INVENTION

The present invention relates to a magnetic recording medium, particularly, to improving the surface properties of a magnetic tape.

In recent years, it has been strongly desired to form magnetic layers of excellent surface smoothness on base materials in the magnetic tape, especially the video tape, art. As examples of processes for improving the surface roughness of the magnetic layer, there is known (1) the calender process in which the magnetic layer is heated and pressed between a metal roll and an elastic roll after it has been formed on a base material, subjected to orientation and then dried (as described in U.S. Pat. Nos. 2,688,567, 2,998,325 and 3,783,023, German Patent application (OLS) No. 2,405,222, Japanese Patent Applications (OPI) Nos. 53631/74, 10337/75, 99506/75, 92606/76, 102049/76 and 10340/76 (the term "OPI" as used herein refers to a "published unexamined Japanese patent application"), Japanese Patent Publication No. 17404/77, etc.); (2) the smoothing process in which the surface of the magnetic layer is smoothed prior to drying with a magnetic smoother, a smoothing coil, a smoothing blade, a smoothing blanket or the like (as described in Japanese Patent Publications 38802/72 and 11336/73, Japanese Patent Applications (OPI) 53631/74, 112005/75 and 77303/76, British Pat. No. 1,191,424, and the like).

However, even a magnetic tape having a magnetic layer surface smoothed by one of the above described processes suffers from various defects, e.g., the magnetic layer surface has a high coefficient of friction, is easily scraped and damaged, adheres to a tape transporting system in a video tape handler (which comprises rotating drums, capstans, tape guides, etc.) and undergoes cinching when wound around a reel, hub or the like, and so on.

Thus, improvements in surface roughness of a magnetic layer attained by the above described processings adversely affect tape transporting characteristics to a great extent.

On the other hand, methods for improving tape transporting characteristics are also known (as described in, e.g., Japanese Patent Application (OPI) No. 128683/78) in which the surface roughness of the back side of a magnetic tape is increased by providing a backing layer which contains a lubricant on the surface of the non-magnetic flexible support opposite to the surface whereon a magnetic layer is formed.

However, it turns out that with this method the magnetic tape still suffers the disadvantages that the coated backing layer is liable to be scraped by contact with parts of a tape transporting system to cause partial dropout of the backing layer, scraping of the coated material from the backing layer is accelerated by the coated material scraped from the backing layer adhering to the tape transporting system, the gap of a magnetic head is stopped up with the coated material scraped from the backing layer and so on. Further, it is very difficult to apply the backing layer to have a uniform thickness.

In accordance with the above described calender process, smoothing process, backing layer process and the like, the chroma signal to noise ratio (hereinafter abbreviated as C-S/N) and the video signal to noise ratio (hereinafter abbreviated as Y-S/N) can be improved, but magnetic tapes having all characteristics adequate for practical use cannot be obtained.

An improvement in the surface property of a magnetic tape can be attained by the use of a base material possessing an excellent surface property and, further, by appropriately selecting ingredients for the magnetic layer and by subjecting the surface of a magnetic layer to calender processing.

Also, an improvement in tape transporting characteristics can be attained by a careful selection of lubricants to be incorporated into a magnetic layer or by increasing the surface roughness of a magnetic layer or the base to a certain extent. However, in order to increase both the C-S/N and the Y-S/N ratios it is necessary to render the surface roughness of the magnetic layer as low as possible, that is to say, to render the surface of the magnetic layer as smooth as possible which is essentially incompatible with the necessity to render the surface of the magnetic layer somewhat rough to improve tape transporting characteristics.

Accordingly, a balanced improvement in both the C-S/N and Y-S/N ratios and the tape transporting characteristics using conventional methods have turned out to be difficult.

SUMMARY OF THE INVENTION

Therefore, an object of the present invention is to provide magnetic tape possessing improved C-S/N and Y-S/N ratios which has a non-magnetic support which is not scraped of damaged by passage through the tape transport of a magnetic tape handler, which exhibits stable tape-transporting characteristics, does not cause cinching because it has a surface of excellent quality on the side to be wound around a reel, a hub or the like, does not generate which could stop the gap of a magnetic head and, further, which hardly results in magnetic head wear.

As a result of various investigations on the above points, we have found the following: The C-S/N and Y-S/N ratios and tape transporting characteristics have a close relationship to the surface properties of a magnetic tape. In the event that a magnetic layer has a surface roughness of a relatively long pitch (in other words, a long wavelength), such a surface roughness has no influence on the C-S/N and the Y-S/N ratios. On the other hand, in the event that a magnetic layer has a surface roughness of a relatively short pitch (in other words, a short wavelength), such a surface roughness has no influence on tape transporting characteristics and durability. The term "pitch" used herein means a distance between adjacent tops of the surface roughness.

Therefore, we concluded that the conflicting characteristics as described above can be simultaneously improved in a well balanced state if surface roughness is made as small as possible in the pitch region of about 5 $\mu$m to about 100 $\mu$m and is made as great as possible in the pitch region of about 300 $\mu$m or above.

Thus, the objects of the present invention are attained with a magnetic recording medium obtained by applying a magnetic layer to a non-magnetic flexible support and then drying the same wherein the maximum arithmetical average roughness (Ra) is controlled to at least about 80 Å in the surface roughness pitch region greater than about 300 $\mu$m, and the maximum arithmetical average roughness (Ra) is controlled to about 40 Å or less in the surface roughness pitch region of about 5 $\mu$m to about 100 $\mu$m.

DETAILED DESCRIPTION OF THE INVENTION

Figure 1:
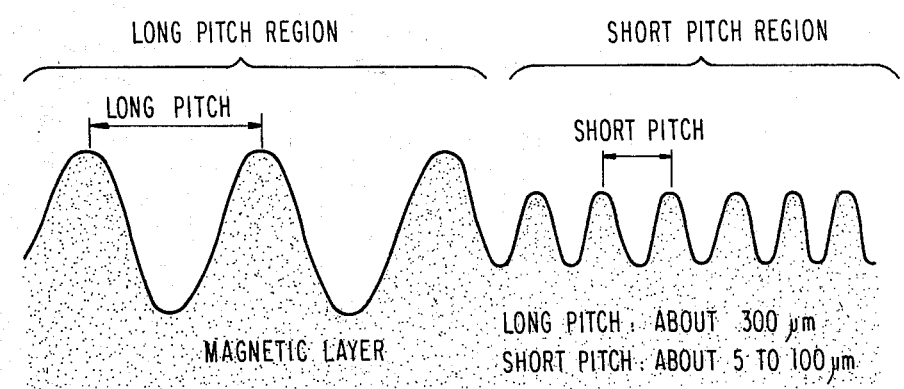
FIG. 1 illustrates a cross-sectional view of the surface of a magnetic layer of the present invention.
Figure 2:
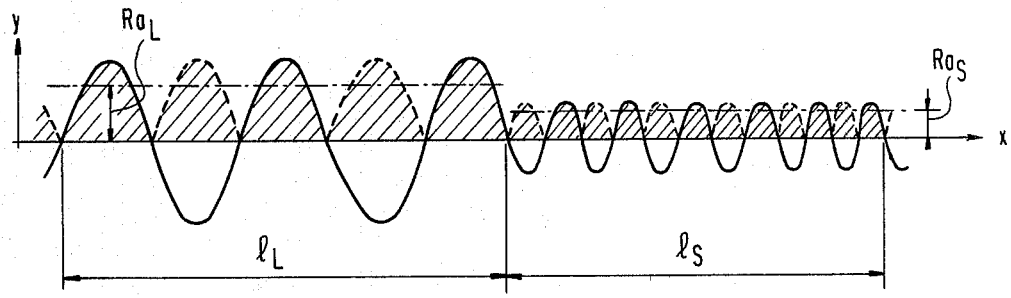
FIG. 2 illustrates a roughness curve of the surface shown in FIG. 1.

According to the standard provided in JIS-B0601 (1976), a stylus roughness tester is used in the present invention to obtain sectional curves showing the magnified roughness condition of a magnetic layer as shown in FIG. 1. In the thus-obtained sectional curve, when the center line of the sectional curve at a definite length (l) is taken as the x-axis as shown in FIG. 2, the roughness curve y is expressed as a function of x; that is, $y = f(x)$. The arithmetical average roughness Ra as used herein is then defined by the following equation and expressed in terms of Å:

$$Ra = \frac{1}{l} \int_0^l |f(x)| dx$$

In FIG. 2, $Ra_L$ is the arithmetical average roughness in the long pitch region when the center line of the sectional curve at a definite length $l_L$ is taken as the x-axis and $Ra_S$ is the arithmetical average roughness in the short pitch region when the center line of the sectional curve at a definite length $l_S$ is taken as the x-axis. In general, however, it is difficult to measure only the long pitch region (i.e., without including the short pitch region) or vice versa. Therefore, the short pitch region or the long pitch region may be removed from the sectional curve obtained so as to calculate a more accurate arithmetical average roughness, if desired.

In practice, Ra can be calculated according to JIS-B0601 (1976), JIS-B0610 (1976), JIS-B0651 (1973), JIS-B0652 (1973) and so on.

Only when the maximum value of arithmetical average roughness Ra in the magnetic layer surface of the present invention is controlled within the range of from about 80 Å to about 1μ, preferably from 120 Å to 1,000 Å, in the region of surface roughness pitch greater than 300 μm, and generally up to 10 cm, and further is controlled within the range of from about 5 Å to about 40 Å, preferably 20 Å or less, in the surface roughness pitch region of about 5 μm to about 100 μm, are improvements in the C-S/N and Y-S/N ratios appropriately balance with those in tape transporting characteristics and durability.

In order to produce the magnetic recording medium of the present invention, a method in which the above described two types of surface roughness pitches of the magnetic layer are controlled by suitably choosing a binder and by adding thereto fillers such as packing agents, abrasives, conductive powders or the like or a method in which the surface roughness pitches are transferred to the magnetic layer using a metal roll having the above described two kinds of surface roughness pitches by calender processing after coating and drying the magnetic layer can be employed.

Specifically, in the former method a large filler having a grain size ranging from about 2 μm to about 30 μm, preferably from 10 μm to 20 μm, should be added to the magnetic layer in order to control the surface roughness pitch to about 300 μm or more, while in order to control it to the range of about 5 μm to about 100 μm a small filler having a grain size ranging from about 0.01 μm to about 5 μm, preferably from 0.01 μm to 2 μm, should be added to the magnetic layer.

The addition amounts of the large filler and the small filler are adjusted to about 10 to 50 parts by weight and about 10 to 30 parts by weight, respectively, per 100 parts by weight of binder used. By the simultaneous presence of both the large and the small fillers into the magnetic layer, a magnetic recording medium having a surface roughness meeting the above described requirements is obtained.

On the other hand, in the latter method surface roughness pitches which satisfy the above described conditions for transfer using a super calendering technique are formed on the surface of a calender roll (e.g., a metal roll) by, for example, scraping the surface followed by grinding and/or plating, and this metal roll is arranged on the side of the magnetic layer of the magnetic tape to be processed and, further, an elastic roll made of cotton or a synthetic resin (e.g., nylon, polyurethane or the like) (e.g., a back-up roll) is arranged on the back side of the non-magnetic support of the magnetic tape to be processed. Using a super calender apparatus in which 2 to 20 nips of calender rolls are provided so as to have the above described arrangement, the surface roughness pitches formed on the above described metal rolls are transferred onto the magnetic layer in the calender process after coating and drying of the magnetic layer under conditions that the pressure between each two rolls (linear pressure) ranges from 100 kg/cm to 400 kg/cm, the temperature ranges from 20° C. to 150° C. and the calendering speed ranges from 5 m/min to 150 m/min, resulting in the production of the magnetic recording medium having the above-described surface roughness defined by the present invention.

More specifically, when it is desired to form the roughness having a pitch of 300 μm or greater on the surface of the magnetic tape, a roughness having a pitch about three times as long as the above described pitch should be formed in advance on the surface of metal rolls, while when it is desired to form the roughness having a pitch of 5 μm to 100 μm on the magnetic tape, a roughness having 0.5 to 2 times the pitch the above described ones should be previously formed on the metal rolls.

The magnetic layer of the present invention is a coated type layer obtained by coating a magnetic coating solution which is prepared by mixing a ferromagnetic fine powder with a binder, a lubricant, additives, a solvent and so on and kneading followed by subjecting the coated layer to orientation and then drying.

Processes of preparing magnetic coating materials employable for the above described coated type magnetic layer are described in detail in, for example, Japanese Patent Publications Nos. 15/60, 26794/64, 186/68, 28043/72, 28045/72, 28046/72, 28048/72, 31445/72, 11162/73, 21331/73 and 33683/73, Russian Pat. No. 308,033, U.S. Pat. Nos. 2,581,414, 2,855,156, 3,240,621, 3,526,598, 3,728,262, 3,790,407 and 3,836,393, and so on. Each of the magnetic coating materials described in these specifications contains a ferromagnetic fine powder, a binder and a coating solvent as main components and, optionally, can contain a dispersing agent, a lubricant, abrasives, a filler, an antistatic agent, a rust preventing agent, an antimold agent and so on.

As the above described ferromagnetic fine powder, ferromagnetic iron oxide powders, ferromagnetic chromium dioxide powder, ferromagnetic alloy powders and the like can be employed.

The above described ferromagnetic iron oxides include those which are represented by the general formula $FeO_x$, where $1.33 \leq x \leq 1.50$, specifically include maghemite ($\gamma$-$Fe_2O_3$, $x=1.50$), magnetite ($Fe_3O_4$, $x=1.33$) and their Berthollide compounds ($FeO_x$, $1.33 < x < 1.50$). The value of x is defined by the equation:

$$x = \frac{1}{200} \{2 \times [\text{atomic \% of Fe(II)}] + 3 \times [\text{atomic \% of Fe(III)}]\}$$

To these ferromagnetic iron oxides, divalent metals may be added. Examples of such divalent metals include Cr, Mn, Co, Ni, Cu, Zn and so on; they are added in a proportion of 0 to 10 atomic % based on the iron oxide present.

Ferromagnetic chromium dioxides employable as the ferromagnetic powder include $CrO_2$ and those which are prepared by adding metals such as Na, K, Ti, V, Mn, Fe, Co, Ni, Tc, Ru, Sn, Ce, Pb, etc.; semiconductors such as P, Sb, Te, etc.; or oxides of these metals to $CrO_2$. The proportion of such additives is 0 to 20 wt% based on the $CrO_2$ present.

Ferromagnetic iron oxides and ferromagnetic chromium dioxide are each most effective when in an acicular crystal form wherein the acicular ratio ranges from 2/1 to 20/1, preferably 5/1 or more, and the average length ranges from 0.2 $\mu$m to 2.0 $\mu$m.

The above described ferromagnetic alloy powder contains one or more metals as an essential component in a proportion of 75 wt% or more based on the total weight of the ferromagnetic alloy powder, which metal component is composed of 80 wt% or more of at least one ferromagnetic metal (selected from the group consisting of Fe, Co, Ni, Fe-Co, Fe-Ni, Co-Ni and Co-Ni-Fe) and 20 wt% or less, preferably 0.5 to 5 wt%, of one or more non-ferromagnetic metals (such as Al, Si, S, Sc, Ti, V, Cr, Mn, Cu, Zn, Y, Mo, Rh, Pd, Ag, Sn, Sb, Te, Ba, Ta, W, Re, Au, Hy, Pb, Bi, La, Ce, Pr, Nd, B, P, etc.). It may optionally contain small amounts of water, hydroxides or/and oxides.

The ferromagnetic alloy powder is made up of grains having a length of about 0.5 $\mu$m or less.

Binders which can be employed in the present invention include conventional, known thermoplastic resins, thermosetting resins, reactive resins and mixtures thereof, as described in, for example, U.S. Pat. Nos. 4,154,895, 3,597,273 and 4,068,040.

Thermoplastic resins having softening points of 150° C. to −45° C., average molecular weights of 10,000 to 200,000 and polymerization degrees of about 100 to 1,000 are preferred with specific examples including vinyl chloride-vinyl acetate copolymers, vinyl chloridevinylidene chloride copolymers, vinyl chlorideacrylonitrile copolymers, acrylate-acrylonitrile copolymers, acrylate-vinylidene chloride copolymers, acrylate-styrene copolymers, methacrylate-acrylonitrile copolymers, methacrylate-vinylidene chloride copolymers, methacrylate-styrene copolymers, urethane elastomers, polyvinyl fluoride, vinylidene chlorideacrylonitrile copolymers, butadiene-acrylonitrile copolymers, polyamide resins, polyvinyl butyral, cellulose derivatives (such as cellulose acetate butyrate, cellulose diacetate, cellulose triacetate, cellulose propionate, nitrocellulose, etc.), styrene-butadiene copolymers, polyester resins, thermoplastic resins based on various synthetic rubber series materials (such as polybutadiene, polychloroprene, polyisoprene, styrene-butadiene copolymers and the like) and mixtures thereof can be used.

Thermosetting resins and reactive resins each preferably have a molecular weight of 200,000 or less in the state of a coating solution, but they undergo a condensation or an addition reaction after being coated and dried at appropriate conditions whereby their molecular weight becomes infinite. Of these resins, those which do not soften or melt before they are pyrolyzed are preferred. Specific examples of such resins include phenol-formaldehyde novolak resins, phenol-formaldehyde resol resins, phenol-furfural resins, xylene-formaldehyde resins, urea resins, melamine resins, drying oil modified alkyd resin, phenol resin modified alkyd resins, maleic acid resin modified alkyd resins, unsaturated polyester resins, combinations of an epoxy resin and hardener (such as a polyamine, acid anhydride, polyamide resin or the like), moisture hardenable terminal isocyanate polyester resins, moisture hardenable terminal isocyanate polyether resins, polyisocyanate prepolymers (such as compounds prepared by reacting a diisocyanate with a low molecular weight triol and having 3 or more isocyanate groups in their respective molecules, a diisocyanate trimer or a diisocyanate tetramer), resins comprising a polyisocyanate prepolymer and having active hydrogen (such as a polyester polyol, polyether polyol, acrylic acid copolymers, maleic acid copolymers, 2-hydroxyethylmethacrylate copolymers, p-hydroxystyrene copolymers and the like), mixtures of the above described resins, and so on.

These binders are used independently or in various combinations and a wide variety of additives can be added thereto. The binder is generally used in a mixing ratio of 8 to 25 parts by weight per 100 parts by weight of ferromagnetic powder and in this case the dry thickness of the magnetic recording layer is preferably adjusted to the range of 0.5 to 6 $\mu$m.

In the magnetic recording layer, additives such as a dispersing agent, a lubricant, abrasives, an antistatic agent, a filler, a rust preventing agent, an antimold agent and so on may be incorporated in addition to the above described binder and ferromagnetic fine powder.

Examples of dispersing agents include: fatty acids containing 12 to 18 carbon atoms (having the formula $R_1COOH$, where $R_1$ represents an alkyl or an alkenyl group which contains 11 ot 17 carbon atoms) with specific examples including caprylic acid, capric acid, lauric acid, myristic acid, palmitic acid, stearic acid, oleic acid, elaidic acid, linolic acid, linolenic acid, stearolic acid and the like; metal soaps prepared from the above described fatty acids and alkali metals (such as Li, Na, K and the like) or alkaline earth metals (such as Mg, Ca, Ba and the like); esters of the above described fatty acids which contain fluorine atoms; amides of the above described fatty acids; polyalkylene oxide alkylphosphates; lecithin; trialkyl polyalkyleneoxy quaternary ammonium salts (the alkyl moieties of which contain 1 to 5 carbon atoms and whose alkylene moiety is ethylene, propylene or the like). Besides these compounds, higher alcohols containing 12 or more of carbon atoms and, further, the sulfuric acid esters thereof and so on can be also used. A dispersing agent as described above is preferably added in a proportion of 0.5 to 20 parts by weight per 100 parts by weight of binder.

Examples of lubricants include: a silicone oil such as a dialkylpolysiloxane (the alkyl moiety of which contains 1 to 5 carbon atoms), a dialkoxypolysiloxane (the alkoxy moiety of which contains 1 to 4 carbon atoms), a monoalkylmonoalkoxypolysiloxane (the alkyl moiety and the alkoxy moiety of which contain 1 to 5 carbon atoms and 1 to 4 carbon atoms, respectively), a phenylpolysiloxane, a fluoroalkylpolysiloxane (the alkyl moiety of which contains 1 to 5 carbon atoms) or the like; conductive fine powders such as graphite or the like; inorganic fine powders such as molybdenum disulfide, tungsten disulfide or the like; fine plastic powders such as polyethylene, polypropylene, polyethylene-vinyl chloride copolymers, polytetrafluoroethylene or like powders; α-olefin polymers; unsaturated aliphatic hydrocarbons which are liquid at ordinary temperatures (which correspond to a compound to whose terminal carbons n-olefin double bonds are attached, and which contains about 20 carbon atoms); fatty acid esters prepared from monobasic fatty acids containing 12 to 20 carbon atoms and monohydric alcohols containing 3 to 12 carbon atoms; fluorocarbons; and so on can be employed. A lubricant as described above is preferably added in a proportion ranging from 0.2 to 20 parts by weight to 100 parts by weight of binder.

Abrasives employable in the present invention include materials which have been generally used as abrasives in this art; for example, fused alumina, silicon carbide, chromium oxide ($Cr_2O_3$), corundum, artificial corundum, diamond, artificial diamond, garnet, emery (main components; corundum and magnetite) and so on. These abrasives have a Mohs' hardness of 5 or above and an average grain size of 0.05 to 5$\mu$, preferably 0.1 to 2$\mu$. Such abrasives are preferably added in a proportion of 0.5 to 20 parts by weight to 100 parts by weight of binder.

As a filler, goethite ($\alpha$-FeOOH), iron oxide red ($\alpha$-$Fe_2O_3$), finely powdered silica gel, colloidal silica, precipitated silica, flake-like silicon compounds, calcium carbonate, barium carbonate, strontium carbonate, barium chloride, strontium chloride, barium sulfate, magnesium silicate, magnesium hydroxide, potassium titanate, zinc oxide, titanium oxide, kaolin, talc, diatomaceous earth, $Cu_2O$, $2ZnO.SiO_2.H_2O$, basic lead compounds, trifluorides of Ce, La, Pr, Nd and Sm, glass powder and so on can be employed. They are described in, for example, Japanese Patent Publications Nos. 22074/72, 8561/76, 19971/76 and 18562/77, Japanese Patent Applications (OPI) 17608/75, 30503/75, 57402/76, 13810/77, 104202/78, 131499/78 and 21805/79, U.S. Pat. Nos. 3,007,807 and 3,929,658, British Patent 1,536,225, German Patent Application (OLS) No. 1,929,171, and so on.

As an antistatic agent, conductive fine powders such as carbon black, carbon black graft polymers and the like; natural surface active agents such as saponin and the like; nonionic surface active agents of the alkylene oxide, glycerine, glycidol and like series; cationic surface active agents such as higher alkylamines, quaternary ammonium salts, pyridine and other heterocyclic ring compounds, phosphoniums, sulfoniums and the like; anionic surface active agents containing acidic groups such as carboxylic acid, sulfonic acid, phosphoric acid, sulfate, phosphate and like groups; amphoteric surface active agents such as amino acids, aminosulfonic acids, sulfuric acid or phosphoric acid esters of aminoalcohols and the like; and so on may be employed. The above described conductive powders or surface active agents are added in a proportion of 0.2 to 20 parts by weight or 0.1 to 10 parts by weight, respectively, to 100 parts by weight of binder. These surface active agents may be added singly or plurally. These surface active agents are not only employed as an antistatic agent but also occasionally usable for other purposes; for example, to improve dispersibility, magnetic characteristics and lubricity and as a coating aid.

As a rust preventing agent, phosphoric acid, sulfamide, guanidine, pyridine, amine, urea, zinc chromate, calcium chromate, strontium chromate and the like can be used. In particular, rust preventing agents which tend to evaporate (inorganic or organic acid salts of amines, amides or imides), with specific examples including dicyclohexylamine nitrite, cyclohexylamine chromate, diisopropylamine nitrite, diethanolamine phosphate, cyclohexylammonium carbonate, hexamethylenediamine carbonate, propylenediamine stearate, guanidine carbonate, triethanolamine nitrite, morpholine stearate and the like are more effective. Such a rust preventing agent is preferably used in a proportion of 0.01 to 20 parts by weight to 100 parts by weight of the ferromagnetic powder.

As an antimold agent, salicyl anilide, bis(tributylstannic) oxide, mercury phenyloleate, copper naphthenate, zinc naphthenate, mercury naphthenate, pentachlorophenol, trichlorophenol, p-dinitrophenol, sorbic acid, p-oxybutylbenzoate, dihydroaceto acid or the like is used in a preferred proportion of 0.01 to 5 parts by weight to 100 parts by weight of binder.

The magnetic recording layer of the present invention is formed by coating a magnetic coating solution (which is prepared by dissolving the above described composition in an appropriate organic solvent, kneading and homogeneously dispersing the composition in the solvent) on a non-magnetic support and then drying. The ferromagnetic fine powder in the magnetic layer may be subjected to orientation after coating of the magnetic layer and before drying.

Useful organic solvents include ketones such as acetone, methyl ethyl ketone, methyl isobutyl ketone, cyclohexanone and the like; esters such as methyl acetate, ethyl acetate, butyl acetate, ethyl lactate, glycol acetate monoethyl ether and the like; glycol ethers such as ether, glycol dimethyl ether, glycol monoethyl ether, dioxane and the like; toluene; xylene; chlorinated hydrocarbons such as methylene chloride, ethylene chloride, carbon tetrachloride, chloroform, ethylene chlorohydrin, dichlorobenzene and the like; and so on.

Materials for the non-magnetic support include polyesters such as polyethylene terephthalate, polyethylene-2,6-naphthalate, etc.; polyolefins such as polyethylene, polypropylene, etc.; cellulose derivatives such as cellulose triacetate, cellulose diacetate, cellulose acetate butyrate, cellulose acetate propionate, etc.; vinyl resins such as polyvinyl chloride, polyvinylidene chloride, etc.; and other plastics such as polycarbonate, polyimide, polyamide, etc. In addition, non-magnetic metals such as aluminium, copper, tin, zinc, non-magnetic alloys containing these metals, stainless steel, etc.; and papery materials such as paper, baryta, paper on which a polymer of an α-olefin containing 2 to 10 carbon atoms, such as polyethylene, polypropylene, an ethylenebutene copolymer, etc., is coated or laminated can also be used as the support material. These non-magnetic supports may be employed in a transparent or opaque state according to the end use purpose of the magnetic tape.

Moreover, the non-magnetic support may be employed in the form of film, tape or sheet, and it is selected from various kinds of materials depending upon its form as occasion demands. The surface roughness thereof is preferably controlled to 0.2 μm or less.

The thickness of such a non-magnetic support preferably ranges from about 2 μm to 30 μm, more preferably from 3 μm to 25 μm.

The above described support may have a backcoat on the surface opposite the side where a magnetic layer is provided for the purposes of prevention of static electricity, prevention of wow and flutter, improvement in durability, matting treatment of the back surface and so on when it is applied to the magnetic recording body in film form, tape form, sheet form, thin layer flexible disk form or the like.

The backcoat is provided on the back surface of the above described support by coating a coating solution, which is prepared by homogeneously dispersing at least one additive selected from the above described lubricants, abrasives and/or antistatic agents into one of the above described binders dissolved in one of the above described solvents using a kneading technique (optionally with the aid of a dispersing agent) and then drying. The backcoat may be provided on the support before or after the magnetic layer is provided on the support.

Preferred additives which are usually employed are carbon black, graphite, talc, $Cr_2O_3$, $\alpha$-FeHD $2O_3$ (iron oxide red), silicon oil and so on.

The mixing proportion of the additives to the binder contained in the backing layer is about 30 to 85 wt%, preferably 40 to 80 wt%, in the case of inorganic additives, and about 0.1 to 30 wt%, preferably 0.2 to 20 wt%, in the case of organic additives. The dry coverage of the backing layer ranges from about 0.5 to 50 μm, which is selected depending upon the total thickness of the magnetic recording element, the end use purpose thereof, the form thereof and so on, in a manner known to the art.

At the time of kneading, the ferromagnetic fine powder and other ingredients may be added to the kneader at the same time or individual ingredients may be introduced into the kneader in series. For example, a ferromagnetic fine powder may first be added to a solvent containing a dispersing agent and kneaded for a prescribed time when it is intended to prepare a magnetic coating solution.

For kneading, various kinds of kneaders may be used, e.g., a double roll mill, a triple roll mill, a ball mill, a pebble mill, a trommel, a sand grinder, a Szegvari attriter, a high speed impeller disperser, a high speed stone mill, a high speed impact mill, a high speed mixer, a homogenizer, an ultrasonic disperser and so on.

Useful techniques for kneading dispersions are described in T. C. Patton, *Paint Flow and Pigment Dispersion* (published by John Wiley & Sons Co., 1964) and also in U.S. Pat. Nos. 2,581,414 and 2,855,156.

As methods of coating the above described magnetic recording layer or backcoat on a support, air doctor coating, blade coating, air knife coating, squeeze coating, impregnation coating, reverse roll coating, transfer roll coating, gravure coating, kiss coating, cast coating, spray coating and so on can be used as can other coating methods. These methods are illustrated in detail in *Coating Engineering*, pages 253 to 277, Asakura Shoten, Tokyo (1971).

The magnetic layer coated on a support using a method as described above is optionally subjected to processing to orient the ferromagnetic fine grains contained therein and then the magnetic layer is dried, and eventually cut to the desired size. Thus, the magnetic recording element of the present invention is produced.

Orienting is carried out under the following conditions: A magnetic field is applied to the magnetic layer for orientation of a strength of about 500 to 4,000 oersted for both A.C. and D.C. orientation. The orienting direction of the ferromagnetic fine grains is determined dependant on the end use of the magnetic layer. Namely, in the case of sound tape, small-sized video tape, memory tape and the like, the orienting direction is parallel to the length direction of the tape, while in the case of video tape for broadcasting and the like, it is inclined at an angle of 30 to 90 degrees to the length direction of the tape.

The drying temperature for the magnetic and backcoat layers is about 50° to 120° C., preferably 70° to 100° C., more particularly, 80° to 90° C. Air drying is preferably used and the amount of the air flow is 1 to 5 kl/m², preferably 2 to 3 kl/m²; the drying time is about 30 seconds to 10 minutes, preferably 1 to 5 minutes.

Preparation processes for the magnetic recording medium and each of materials therefor as illustrated hereinbefore are also described in Japanese patent applications (OPI) Nos. 11703/79, 14711/79, 21805/79, 21806/79, 24000/79, 36704/79, 39104/79, 4011/79 and 46010/79, and Japanese Patent Applications Nos. 43864/78, 68637/78, 91179/78, 111580/78, 111581/78, 26880/79, 87241/79, 94132/79 and 95768/79, and so on.

The magnetic recording medium of the present invention, as described above, has the following effects:

(i) The C-S/N ratio is improved to a great extent.
(ii) The Y-S/N ratio is improved to a great extent.
(iii) Scraping of the magnetic layer surface is prevented.
(iv) Transport characteristics of the magnetic tape are stable.
(v) The magnetic tape is of good quality on its winding side and cinching is prevented.
(vi) The gap of a magnetic head is prevented from being stopped up.
(vii) Abrasion of a magnetic head is reduced to a great extent.
(viii) Adhesion of the magnetic tape to the tape transporting system in a magnetic tape handler is prevented.

The present invention will now be illustrated in greater detail by reference to the following examples. It should be understood that ingredients, ratios, the order of operations and so on can be changed without departing from the scope of the present invention; therefore, the invention is not intended to be construed as being limited to the following examples.

All parts in the following examples are by weight.

EXAMPLE 1

| Composition of Magnetic Coating Solution A: | |
|---|---|
|  | parts |
| Co (4 atomic %) containing $\gamma$-$Fe_2O_3$<br>Hc = 680 Oe, average length of grain<br>= 0.3 μm, acicular ratio = 6 | 300 |
| Nitrocellulose<br>N content = 11.2–12.3%,<br>polymerization degree = 550 | 20 |
| Vinyl Chloride-Vinylidene Chloride Copolymer<br>copolymerization ratio = 7/3 (molar),<br>polymerization degree = 400 | 14 |
| Epoxy Resin (Epikote 1001)<br>reaction product of bisphenol A and | 22 |

-continued

| Composition of Magnetic Coating Solution A: | |
|---|---|
| | parts |
| epichlorohydrin, molecular weight = 900, epoxy equivalent = 460–520, hydroxyl group content = 0.29%, product of Shell Oil Co. | |
| Dimethylpolysiloxane polymerization degree = about 60 | 1.5 |
| Soybean Lecithin | 3 |
| $Al_2O_3$ average grain size = 4 μm | 5 |
| Carbon Black average grain size = 2 μm | 25 |
| Isocyanate Compound (Desmodur L-75) 75 wt % solution of reaction product of 3 mols of 2,4-tolylenediisocyanate and 1 mol of trimethylolpropane in ethyl acetate, molecular weight = about 760, product of Bayer A.G. | 18.4 |
| Butyl Acetate | 800 |
| Butanol | 200 |

The above described magnetic coating solution A was coated on a polyethylene terephthalate (PET) film support having a thickness of 14.5 μm and Ra of 0.01 to 0.015μ, at a dry coverage of 5.5 μm and then subjected to orientation in a D.C. magnetic field of 2,500 Oe for 0.02 sec., followed by drying at 100° C. for 2 min. The broad magnetic web obtained was then subjected to super calendering using a 10-nip structure of alternating metal and elastic rolls. The metal rolls were chromium-plated steel rolls and correspond to a calender roll; the elastic rolls were cotton rolls and correspond to a back-up roll. The pressure between the rolls (linear pressure) was 250 kg/cm and the temperature was 70° C. with a calendering speed of 20 m/min.

In order to control the arithmetical average roughness (Ra) of the magnetic layer surface, various surface roughness having a pitch greater than the desired pitch to be formed on the magnetic tape surface, specifically by a factor of about 3 in the case that a 300 μm or greater pitch is desired to be formed on the magnetic tape surface, or by a factor of from about 0.5 to 2 in the case that a 5 to 100 μm pitch is desired to be formed on the magnetic tape surface, were formed on the surfaces of the metal rolls in advance of processing.

The thus obtained broad magnetic web was slit to obtain a tape having a breadth of ½ inch and a length of 248 m. The resulting tape was set in a VHS type video tape cassette (T-120). In this manner, sample tapes (No. 1 to No. 18) were obtained.

The arithmetical average roughness (Ra), the Y-S/N ratio, the C-S/N ratio, the coefficient of abrasion, the degress of base scraping, the occurrence of magnetic head clogging, the occurrence of cinching and the degree of head abrasion were measured with each sample. The results obtained are shown in Table 1.

TABLE 1

| Sample No. | Material of Support (Thickness: μm) | Magnetic Coating Solution (Dry Coverage: μm) | Arithmetical Average Roughness (Ra: A) (cf. 1) | |
|---|---|---|---|---|
| | | | Pitch >300 μm | Pitch 5 μm–100 μm |
| 1 | PET (14.5) | A (5.5) | 40 | 40 |
| 2 | PET (14.5) | A (5.5) | 40 | 50 |
| 3 | PET (14.5) | A (5.5) | 60 | 30 |
| 4 | PET (14.5) | A (5.5) | 60 | 40 |
| 5 | PET (14.5) | A (5.5) | 60 | 50 |
| 6 | PET (14.5) | A (5.5) | 70 | 30 |
| 7 | PET (14.5) | A (5.5) | 70 | 40 |
| 8 | PET (14.5) | A (5.5) | 70 | 50 |
| 9 | PET (14.5) | A (5.5) | 80 | 30 |
| 10 | PET (14.5) | A (5.5) | 80 | 40 |
| 11 | PET (14.5) | A (5.5) | 80 | 50 |
| 12 | PET (14.5) | A (5.5) | 90 | 30 |
| 13 | PET (14.5) | A (5.5) | 90 | 40 |
| 14 | PET (14.5) | A (5.5) | 90 | 50 |
| 15 | PET (14.5) | A (5.5) | 100 | 30 |
| 16 | PET (14.5) | A (5.5) | 100 | 40 |
| 17 | PET (14.5) | A (5.5) | 100 | 50 |
| 18 | PET (14.5) | A (5.5) | 100 | 70 |

| Sample No. | Y-S/N (dB) (cf. 2) | C-S/N (dB) (cf. 3) | Coefficient of Friction ($T_2/T_1$) (cf. 4) | Base Scraping (cf. 5) | Clogging of Magnetic Head Number of Passes over Tape Transport (cf. 6) | Cinching (cf. 7) | Abrasion of Head (μm/200 Hr) (cf. 8) |
|---|---|---|---|---|---|---|---|
| 1 | +1.0 | ±0 | 4.5 | Much | 30 | Present | (4.0) |
| 2 | +0.6 | −0.5 | 4.2 | Much | 42 | Present | (4.5) |
| 3 | +0.6 | +0.5 | 4.0 | Much | 41 | Present | (4.2) |
| 4 | +0.6 | ±0 | 4.0 | Much | 36 | Present | (4.0) |
| 5 | +0.6 | −0.5 | 4.0 | Much | 72 | Present | (4.0) |
| 6 | +0.4 | +1.0 | 3.8 | Much | 68 | Present | (3.6) |
| 7 | +0.4 | ±0 | 3.8 | Much | 81 | Present | (3.2) |
| 8 | +0.4 | −0.5 | 3.2 | Much | 92 | Present | (4.6) |
| 9 | ±0 | +0.5 | 2.6 | Nothing | >200 | Absent | 1.8 |
| 10 | ±0 | ±0 | 2.5 | Nothing | >200 | Absent | 2.0 |
| 11 | ±0 | −1.0 | 2.1 | Nothing | >200 | Absent | 4.1 |
| 12 | ±0 | +0.5 | 2.1 | Nothing | >200 | Absent | 1.5 |
| 13 | ±0 | ±0 | 2.1 | Nothing | >200 | Absent | 1.8 |
| 14 | ±0 | −0.5 | 2.1 | Nothing | >200 | Absent | 3.6 |
| 15 | ±0 | +0.5 | 2.1 | Nothing | >200 | Absent | 1.6 |
| 16 | ±0 | ±0 | 2.1 | Nothing | >200 | Absent | 2.0 |
| 17 | −0.2 | −0.5 | 2.1 | Nothing | >200 | Absent | 4.9 |

TABLE 1-continued

| 18 | −0.4 | −1.5 | 2.1 | Nothing | >200 | Absent | 6.2 |

(cf. 1): The arithmetic average roughness (Ra = Å) of each magnetic layer was measured using a stylus type surface roughness tester (Model Surfcom-3; product of Tokyo Seimitsu Co.), and determined according to the standard provided in JIS-B0601 (1976) and JIS-B0651 (1973).

(1) The arithmetical average roughness in the pitch region greater than 300 μm: The measured length was 2 mm and the cut-off value (defined in the above JIS-B0601 (1976) and JIS-B0651 (1973)) was 0.8 mm. The degree of influence of roughness having a pitch less than 300 μm present in the measured length on the above described average roughness was found to be 10% or less.

(2) The arithmetical average roughness in the pitch region greater than 5 μm and less than 100 μm: At the time of measurement, the measured length was 2 mm, the cut-off value was 0.08 mm and roughness having a pitch less than 5 μm was screened off by means of Low Pass Filter (48 dB/octave) so as not to measure. The degree of influence of roughness having a pitch greater than 100 μm present in the measured length on the above described average roughness was found to be 5% or less.

(cf. 2): Y-S/N (The S/N ratio of the video signal = dB) was measured using a VHS type video tape recorder (Model NV-8800, product of Matsushita Electric Industrial Co., Ltd.) and a noise meter (Shibasoku Model 925C, product of Shibasoku Co., Ltd.) using a tape transport speed of 3.3 cm/sec.

(cf. 3): C-S/N (The S/N ratio of the chroma signal = dB) was measured under the same conditions as in (cf. 2).

(cf. 4): The coefficient of friction ($T_2/T_1$) was determined by measuring the load $T_2$ on the side of the magnetic surface using a tension analyzer (Tension Analyzer Model 1TA1, product of Nippon Jidoh Seigyo Co., Ltd.) with a tape transporting speed of 3.3 cm/sec and a load ($T_1$) of 40 g at a temperature of 22 to 24° C. and a humidity of 50 to 60% RH. A $T_2/T_1$ less than 3.0 is considered good.

(cf. 5): Base scraping was evaluated as follows: Fast forward and rewind operations were each repeated 100 times for each sample using a VHS type VTR (the above described Model NV-8800). Thereafter, adhesion of powder to the tape guide in the VHS cassette (half) was observed. When adhesion was observed, such is identified as "Much", and when adhesion was not observed such is identified as "Nothing".

(cf. 6): Head clogging is expressed in terms of the number of repeated passes of the tape through the tape transport until the play back level fell 20 dB or more as compared with the initial level for 5 minutes or longer when gray scale recording and play back were repeated for each sample using a VHS type VTR (the above described Model NV-8800) at a temperature of 22 to 24° C. and a humidity of 50 to 60% RH. An improvement in clogging can be appreciated from a practical point of view only when it is possible to repeat tape transport over 200 pass. The transport speed of the tape was 3.3 cm/sec.

(cf. 7): Cinching which was judged to occur when deformation was observed at the end point of a sample tape 248 m long which was wound on a reel under a tension of 40 g at a speed of 5 m/sec. using a VHS type VTR (the above described Model NV-8800) and allowed to stand for 48 hours. When deformation was observed, cinching is expressed as "present".

(cf. 8): Abrasion of head (μm/200 hr) is represented by the mean abrasion amount of two magnetic heads measured after 100 play back passes (using T-120 cassettes after 200 hours), taking as the standard the magnetic heads at the beginning of play back in the clogging test. In Table 1, the symbol ( ) means that clogging occurred before 100 play back passes, and the number parenthesized therein corresponds to the abrasion amount at the time clogging occurred. A small number is better than a larger, and numbers smaller than 2 μm/200 hr are preferable. The transport speed of the tape was 3.3 cm/sec.

EXAMPLE 2

| Composition of Magnetic Coating Solution B: | |
|---|---|
| | parts |
| Co (3 atomic %) containing γ-$Fe_2O_3$ Hc = 690 Oe, average length of grain = 0.32 μm, acicular ratio = 8 | 300 |
| Vinyl Chloride-Vinylidene Chloride Copolymer copolymerization ratio = 7/3, polymerization degree = 400 | 28 |
| Epoxy Resin The same as in Example 1. | 18 |
| Dimethylpolysiloxane polymerization degree = about 60 | 3 |
| $Cr_2O_3$ average grain size = 5 μm | 4 |
| Isocyanate The same as in Example 1. | 24 |
| Butyl Acetate | 900 |
| Methyl Ethyl Ketone | 300 |

The above described magnetic coating solution B was coated on a cellulose triacetate (TAC) film support having a thickness of 14.5 μm at a dry coverage of 5.5 μm, and video tape samples having a width of ½ inch and a length of 248 m (Samples No. 21-29) were obtained in the same manner as in Example 1.

Each of video tape sample obtained was examined for characteristics in the same manner as in Example 1. The results obtained are summarized in Table 2 hereinafter.

EXAMPLE 3

Magnetic coating solution B prepared in Example 2 was coated on a PET film support having a thickness of 24 μm and Ra of 0.01 to 0.012μ, at a dry coverage of 5.5 μm and video tape samples having a width of ½ inch (Samples No. 31-34) were obtained in the same manner as in Example 1.

Each video tape sample obtained was examined for characteristics in the same manner as in Example 1. The results obtained are also summarized in Table 2 hereinafter.

EXAMPLE 4

Magnetic coating solution A prepared in Example 1 was coated on a TAC film support having a thickness of 24 μm and Ra of 0.005 to 0.01μ, at a dry coverage of 5.5 μm and video tape samples having a width of ½ inch (Samples No. 41-44) were obtained in the same manner as in Example 1.

Each of the video tape samples obtained was examined for characteristics in the same manner as in Example 1. The results obtained are also summarized in Table 2.

TABLE 2

| Sample No. | Material of Support (Thickness: μm) | Magnetic Coating Solution (Dry Coverage: μm) | Arithmetical Average Roughness (Ra: Å) (cf. 1) | |
|---|---|---|---|---|
| | | | Pitch >300 μm | Pitch 5 μm-100 μm |
| 21 | TAC (14.5) | B (5.5) | 70 | 30 |
| 22 | TAC (14.5) | B (5.5) | 70 | 40 |
| 23 | TAC (14.5) | B (5.5) | 70 | 50 |
| 24 | TAC (14.5) | B (5.5) | 80 | 30 |
| 25 | TAC (14.5) | B (5.5) | 80 | 40 |
| 26 | TAC (14.5) | B (5.5) | 80 | 50 |

TABLE 2-continued

| Sample No. | | | | |
|---|---|---|---|---|
| 27 | TAC (14.5) | B (5.5) | 90 | 30 |
| 28 | TAC (14.5) | B (5.5) | 90 | 40 |
| 29 | TAC (14.5) | B (5.5) | 90 | 50 |
| 31 | PET (24.0) | B (5.5) | 70 | 40 |
| 32 | PET (24.0) | B (5.5) | 80 | 40 |
| 33 | PET (24.0) | B (5.5) | 90 | 40 |
| 34 | PET (24.0) | B (5.5) | 80 | 50 |
| 41 | TAC (24.0) | A (5.5) | 70 | 40 |
| 42 | TAC (24.0) | A (5.5) | 80 | 40 |
| 43 | TAC (24.0) | A (5.5) | 90 | 40 |
| 44 | TAC (24.0) | A (5.5) | 80 | 50 |

| Sample No. | Y-S/N (dB) (cf. 2) | C-S/N (dB) (cf. 3) | Coefficient of Friction ($T_2/T_1$) (cf. 4) | Base Scraping (cf. 5) | Clogging of Magnetic Head Number of Passes over Tape Transport (cf. 6) | Cinching (cf. 7) | Abrasion of Head ($\mu$m/200 Hr) (cf. 8) |
|---|---|---|---|---|---|---|---|
| 21 | +0.6 | +0.5 | 4.5 | Much | 84 | Present | (6.0) |
| 22 | +0.6 | ±0 | 4.5 | Much | 88 | Present | (5.0) |
| 23 | +0.6 | −1.0 | 4.5 | Much | 74 | Present | (5.0) |
| 24 | ±0 | +1.0 | 3.5 | Nothing | >200 | Absent | 2.0 |
| 25 | ±0 | +0.5 | 2.5 | Nothing | >200 | Absent | 2.0 |
| 26 | ±0 | −1.0 | 2.5 | Nothing | >200 | Absent | 3.0 |
| 27 | ±0 | ±0 | 2.2 | Nothing | >200 | Absent | 2.0 |
| 28 | ±0 | ±0 | 2.2 | Nothing | >200 | Absent | 2.0 |
| 29 | ±0 | −1.0 | 2.2 | Nothing | >200 | Absent | 3.0 |
| 31 | ±0 | +0.5 | 3.1 | Much | 68 | Present | (1.5) |
| 32 | ±0 | +0.5 | 2.5 | Nothing | >200 | Absent | 2.0 |
| 33 | ±0 | ±0.5 | 2.2 | Nothing | >200 | Absent | 2.0 |
| 34 | −1.0 | −0.5 | 2.2 | Nothing | >200 | Absent | 4.0 |
| 41 | ±0 | +0.7 | 3.1 | Much | 94 | Present | (1.5) |
| 42 | ±0 | +0.7 | 2.5 | Nothing | >200 | Absent | 2.0 |
| 43 | ±0 | +0.6 | 2.4 | Nothing | >200 | Absent | 2.0 |
| 44 | −0.8 | −1.0 | 2.6 | Nothing | >200 | Absent | 3.0 |

It can be seen from the results of analyzing the video tape samples prepared in Examples 1 to 4 which are summarized in Table 1 and Table 2 that those which have an excellent balance of characteristics and are highly rated are video tape Sample Nos. 9, 10, 12, 13, 15, 16, 24, 25, 27, 28, 32, 33, 42 and 43.

Specifically, in the case that the maximum value of the arithmetical average roughness (Ra) was smaller than 80 Å in the pitch region greater than 300 μm, it was confirmed that scraping of a magnetic layer, cinching at the winding side of the tape, clogging of a magnetic head and abrasion of a magnetic head increased. In the case that the maximum value of Ra was 80 Å or greater, the above defects were not noted.

On the other hand, when the maximum value of the arithmetical average roughness (Ra) was greater than 40 Å in the pitch region ranging from 5 μm to 100 m, the C-S/N and Y-S/N ratios deteriorated. Under these circumstances, it was confirmed that recording and playback of good quality could not be achieved. However, when the maximum value of Ra was controlled to 40 Å or less, the above defects were not noted.

From the above results, it can be seen that in order to produce magnetic tapes having C-S/N and Y-S/N ratios well balanced with tape transport characteristics it is necessary to control the maximum Ra value of each magnetic layer surface to 80 Å or greater in the surface roughness pitch region greater than 300 μm and to 40 Å or smaller in the surface roughness pitch region greater than 5 μm and less than 100 μm.

Moreover, as is apparent from the results in each of the examples, it was confirmed that the present invention is effective even when the polyester support is replaced by the cellulose ester support, the thickness thereof is altered or the composition of the magnetic layer is changed.

Further, it was confirmed from other experiments that the present conditions of maximum Ra can be also effectively applied to the back surface of a non-magnetic flexible support, the surface of a backing layer provided on the back side of a non-magnetic flexible support or the surface of a protective layer provided on a magnetic layer.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support on which a magnetic layer is formed by: coating on said support an emulsion of magnetic material in a binder, wherein said magnetic material is comprised of large filler having a grain size ranging from about 2 μm to about 30 μm and a small filler having a grain size ranging from about 0.01 μm to about 5 μm; and drying, and subjecting the resulting magnetic recording medium to a calendering process utilizing calender rolls under conditions that the pressure between any two rolls ranges from 100 Kg/cm to 400 Kg/cm at a temperature ranging from 20° C. to 150° C., said resulting magnetic layer having a surface roughness controlled such that the maximum value of the arithmetical average roughness is at least about 80 Å in the surface roughness pitch region greater than about 300 μm and the maximum value of the arithmetical average roughness is about 40 Å to 5 Å in the surface roughness pitch region greater than about 5 μm and smaller than about 100 μm.

2. A magnetic recording medium as in claim 1, wherein the maximum value of the arithmetical average roughness is from 120 Å to 1,000 Å in the surface roughness pitch region greater than about 300 μm, and the maximum value of the arithmetical average roughness is 20 Å or less in the surface roughness pitch region greater than about 5 μm and smaller than about 100 μm.

3. A magnetic recording medium, as claimed in claim 1, wherein said large filler has a grain size of from 10 μm to 20 μm, and said small filler has a grain size ranging from 0.01 μm to 2 μm.

4. A process for producing a magnetic recording medium comprising the steps of:

providing a non-magnetic support base having a surface; coating said non-magnetic support base surface with an emulsion of magnetic material comprising a large filler having a grain size ranging from about 2 μm to about 30 μm and a small filler having a grain size ranging from about 0.01 μm to about 5 μm;

drying said emulsion of magnetic material to form a magnetic layer on said non-magnetic support surface; and subjecting the resulting magnetic recording medium to calendering utilizing calender rolls under conditions such that the pressure between two rolls ranges from 100 Kg/cm to 400 Kg/cm at a temperature ranging from 20° C. to 150° C. resulting in a magnetic layer having a surface roughness controlled such that the maximum value of the arithmetical average roughness is at least about 80 Å in the surface roughness pitch region greater than about 300 μm and the maximum value of the arithmetical average roughness is about 40 Å to 5 Å in the surface roughness pitch region greater than about 5 μm and smaller than about 100 μm 5. A process for producing a magnetic recording medium, as claimed in claim 4, wherein said large filler has a grain size ranging from 10 μm to 20 μm and said small filler has a grain size ranging from 0.01 μm to 2 μm.

* * * * *